US011848746B1

(12) United States Patent
Wang

(10) Patent No.: US 11,848,746 B1
(45) Date of Patent: Dec. 19, 2023

(54) SYSTEM FOR USER TERMINAL ENTRY TO SATELLITE NETWORK ENTRY

(71) Applicant: AMAZON TECHNOLOGIES, INC., Seattle, WA (US)

(72) Inventor: Xiaoyi Wang, Austin, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 5 days.

(21) Appl. No.: 17/647,667

(22) Filed: Jan. 11, 2022

(51) Int. Cl.
*H04B 7/185* (2006.01)

(52) U.S. Cl.
CPC ..... *H04B 7/18547* (2013.01); *H04B 7/18539* (2013.01)

(58) Field of Classification Search
CPC ............ H04B 7/18547; H04B 7/18539; H04B 7/18513; H04B 7/185; H04B 7/1851; H04B 7/18515; H04B 7/1853
See application file for complete search history.

(56) References Cited

U.S. PATENT DOCUMENTS

| | | | | |
|---|---|---|---|---|
| 5,894,674 A * | 4/1999 | Feldman | ................ | G01C 17/04 33/352 |
| 6,272,316 B1 * | 8/2001 | Wiedeman | ......... | H04B 7/18539 455/12.1 |
| 6,594,582 B1 * | 7/2003 | Quinn | ................... | G01S 5/0247 701/4 |
| 8,831,906 B1 * | 9/2014 | Alon | ....................... | G08G 5/045 702/94 |
| 2008/0111737 A1 * | 5/2008 | Haverkamp | ............ | G01S 19/25 342/357.64 |
| 2009/0318167 A1 * | 12/2009 | Pon | ....................... | G01S 19/252 455/456.2 |
| 2022/0123827 A1 * | 4/2022 | Baudoin | ............ | H04B 7/18513 |

FOREIGN PATENT DOCUMENTS

WO    WO-2014020688 A1 * 2/2014 ........... G01C 21/005

* cited by examiner

*Primary Examiner* — Keith Ferguson
(74) *Attorney, Agent, or Firm* — Lindauer Law, PLLC

(57) ABSTRACT

A satellite provides communication between user terminals (UTs) and ground stations that connect to other networks, such as the Internet. To establish initial contact with a satellite, a UT searches for a satellite's beacon using a phased array or other steerable antenna with a directional receive pattern. The UT retrieves a sky coverage map and stored satellite ephemeris data. The sky coverage map defines discrete areas of the entire sky, with each area based on satellite beacon coverage areas, receive beamwidth of the UT receive antenna, and receive antenna horizon limits. Based on a geolocation of the UT, time, and the ephemeris data, a predicted area in the sky of the satellite is determined. Candidate areas of the sky coverage map are determined that overlap the predicted area, and the receive antenna is directed to search the candidate areas for the satellite beacon.

20 Claims, 7 Drawing Sheets

SYSTEM FOR USER TERMINAL ENTRY TO SATELLITE NETWORK ENTRY

BACKGROUND

A satellite may provide communication service to one or more user terminals.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
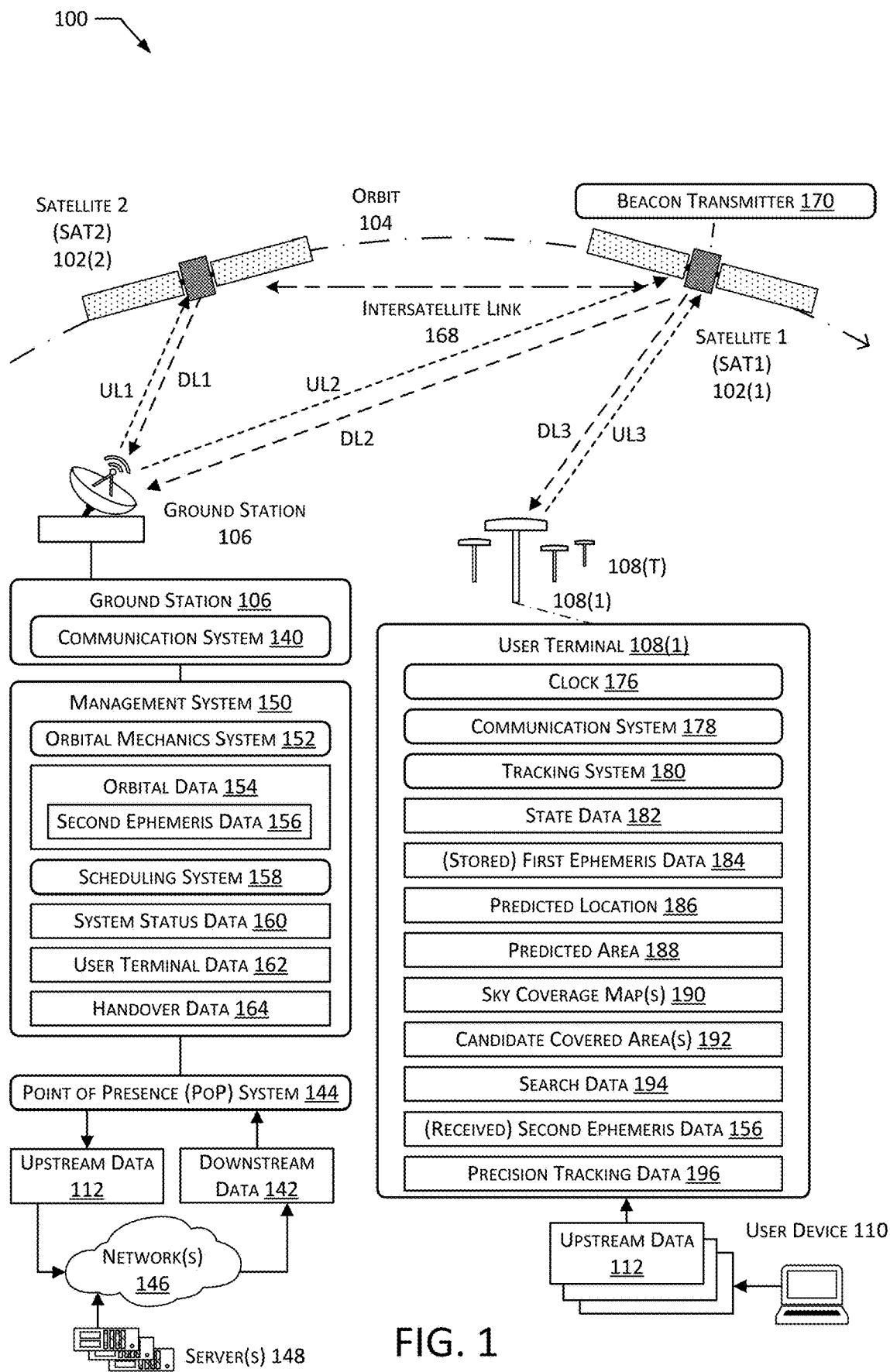
FIG. 1 illustrates a system that uses a sky coverage map to rapidly acquire a satellite for subsequent tracking and communication, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize satellites to wirelessly transfer data between user terminals and ground stations that in turn connect to other networks, such as the Internet. The satellites provide communication services between devices, such as user terminals (UT) located on or near a body such as the Earth. For example, a UT at a first geographic location (geolocation) on the Earth may send upstream data to a first satellite that is in range of the UT. The first satellite may send the upstream data to a ground station, another satellite, and so forth. For example, the first satellite may send the upstream data to a ground station that in turn sends the upstream data to a point-of-presence (PoP). The PoP may then send the upstream data to a device on another network, such as a server on the Internet. Likewise, downstream data destined for the UT may be received at the PoP. The PoP sends the downstream data to the ground station that in turn sends the downstream data to the first satellite. The first satellite then sends the downstream data to the UT.

The period, or duration, of an orbit varies depending upon the altitude of the satellite with respect to the body, eccentricity of the orbit, and so forth. For example, a satellite at an altitude of 600 kilometers (km) will take approximately 96 minutes to complete a circular orbit around the Earth. Depending on a variety of factors including the curvature of the Earth, a satellite in a non-geosynchronous orbit (NGO) may be in range of a particular UT for only a few minutes. From the perspective of the UT, the NGO satellites are in constant motion relative to the Earth. In comparison, a geosynchronous satellite has an orbital period that coincides with the rotation of the Earth, so a geosynchronous satellite appears to remain motionless with respect to the Earth. While the apparent motionlessness with respect to the UT removes the need to account for this motion, other drawbacks associated with the geosynchronous satellite remain.

Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, a real-time voice call in which there is a ¼ second delay can be aggravating. Likewise, time-sensitive communication activities such as remote control of devices, industrial reporting and control, gaming, and so forth may be adversely affected by these latencies. In comparison, a hop involving an NGO satellite at an altitude of 600 km only introduces about 4 ms of latency comprising 2 ms up to the satellite and 2 ms down to the UT. However, the latency does vary as distance to the NGO satellite changes. As a result, compared to using geosynchronous satellites, the use of NGO satellites significantly reduces latencies due to signal travel times.

Using a constellation of many NGO satellites offers significant benefits compared to a geosynchronous satellite. Latency is dramatically reduced, improving usefulness for communication. Shorter distances between the UT and the satellite allow for increased UT density by allowing greater frequency re-use and sharing. Power and antenna gain requirements for both the UT and the satellites are also reduced due to the shorter distances, compared to communication using geosynchronous satellites. This allows for relatively smaller and less expensive satellites to be used.

While the latency introduced by propagation delay in an NGO satellite is less than that of geosynchronous satellites, the dynamic nature of the network using many NGO satellites introduces factors that complicate the process of a UT establishing communication with a satellite and initially joining the network, such as after the UT powers up. Further complicating the situation are additional factors such as beacon beamwidth that determines how large an area of the Earth's surface is reached by the beacon transmission with sufficient power and the receive beamwidth that indicates how large an area of the sky the receiver can cover at a given time while still being able to receive the beacon transmission. Colloquially, for the UT to reliably "hear" the beacon transmission, the UT needs to point the gain of its antenna towards the satellite while the UT is within the footprint of the satellite's beacon signal.

Traditional approaches include searching the entire sky for a beacon transmission. If the UT has access to current ephemeris data a relatively precise predicted location of the satellite may be calculated and used to minimize the search space. However, due to various factors that can affect the orbit of a satellite, the older the ephemeris data is, the less likely the predicted location of the satellite will correspond to the actual location.

Even within the minimized search space, traditional scanning search approaches such as a spiral search or rectangular search may still take too long to complete. For example, the satellite may move out of the search area before the UT is able to locate the beacon, missing the beacon transmission entirely. This problem is particularly acute given swiftly moving NGO satellites, narrow receive beamwidths, transmit power constraints on the beacon transmission, and so forth. As a result, such approaches take an unacceptably long time to complete, and are prone to failing to find the beacon transmission.

Described in this disclosure are systems and techniques to facilitate rapid initial network entry of a UT into a network provided by a constellation of satellites. The UT stores one or more sky coverage maps. Each sky coverage map defines discrete covered areas of the entire sky, with each covered area based at least on beacon beamwidth and corresponding coverage area or footprint, receive beamwidth of the UT receive antenna, and receive antenna horizon limits. The covered area may thus describe a patch of sky within which "reverse coverage" of the receive beamwidth corresponds to the beacon beamwidth, and for which at least a minimum link budget is available to provide reliable reception by the UT. For example, if the link budget calls for a minimum 3 decibel (dB) signal-to-noise (SNR) ratio, this is used to determine the sky coverage map. Each covered area of the sky coverage map describes a coincidence between beacon coverage and the reverse coverage of the receiver with respect to an expected altitude of the satellite(s). Factors that may be used to determine the sky coverage map are beacon beamwidth, receive beamwidth, limits of azimuth and elevation traverse by the receive antenna, altitude of the satellites, and so forth. With the sky coverage map available, instead of searching the sky by scanning across some angular range, the UT has a predetermined set of covered areas towards which the receive antenna may be steered. For example, instead of thousands of possible directions that the receive antenna may be steered, the sky coverage map may specify a relatively small 469 covered areas.

While attempting to find a satellite in the constellation the UT retrieves previously stored ephemeris data about one or more satellites in the constellation. This stored ephemeris data may be out of date. For example, the stored ephemeris data may be stored in the UT at manufacture, before shipment, and so forth. Data such as a current time and a geolocation of the UT is determined. For example, the UT may include a global navigation satellite system receiver that is used to provide time and geolocation. In another example, the UT may communicate with another device such as a smartphone to receive current time and geolocation data. Using the stored ephemeris data, the current time, and the geolocation, a predicted location of one or more satellites of the constellation is calculated. However, this predicted location may differ from the actual location of the satellite due to changes in the ephemeris data, time errors, UT geolocation errors, and so forth. A predicted area may be associated with the predicted location, with the predicted area taking into consideration at least some of these factors. For example, the predicted area may comprise an area in the sky (relative to the UT) that the satellite is expected to be found in 0.999 of the time.

The predicted area may be compared with the covered areas within the sky coverage map. In one implementation, each covered area that overlaps the predicted area may be designated as a candidate covered area. The set of candidate areas are then searched. The search may be sequential, with the receive antenna steered towards a first covered area at a first time, the receive antenna steered towards a second covered area at a second time, and so forth. The order in which the candidate covered areas may be searched may be determined using one or more factors. In one implementation, the candidate covered areas may be searched based on the size of their overlap with the predicted area. For example, the covered area that has an 89% overlap with the predicted area may be searched first, the covered area with a 77% overlap may be searched second, and so forth.

While the gain of the receive antenna is directed towards a particular covered area, a receiver is used to determine and detect, if present, a beacon transmission. The beacon transmission is transmitted by the satellite. In some implementations the beacon transmission may be a dedicated transmission, while in other implementations the beacon transmission may comprise a portion of downlink data transmissions used to communicate with other UTs.

Once a beacon transmission is detected, the UT may begin to track the satellite transmitting the beacon transmission. In one implementation, the beacon transmission may include current ephemeris data for at least a portion of the constellation. In another implementation, the current ephemeris data may be transmitted separately from the beacon transmission. In either event, the UT may receive the current ephemeris data. The current ephemeris data may then be used to determine a more accurate predicted location, relative to the stored ephemeris data, of the satellite. This more accurate predicted location may then be used to steer the antenna (or the gain thereof) for transmission (uplink) and reception (downlink) operation. This tracking may involve steering the antenna in smaller angular increments then those associated with searching the covered areas. For example, during search a change to a different covered area may involve a shift of 7 degrees in azimuth, while during tracking the antenna may change at increments of 1 degree in azimuth.

In other implementations, once the beacon transmission is detected, the UT may track using techniques other than ephemeris data. For example, the UT may determine a direction to track the satellite using signal amplitude, doppler shift of a downlink signal, and so forth.

By using the system and techniques described in this disclosure efficiency of a communication system using a satellite constellation is substantially improved. The time required to find a satellite in the sky and establish communication is substantially reduced. This allows a UT to more quickly establish communication with a satellite and begin using the network to pass traffic.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with its antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the lower altitude of the satellite in NGO, compared to a geosynchronous orbit, provides coverage over a much smaller portion of the Earth. The lower altitude also reduces the distance the electromagnetic signal has to travel. For example, the satellite at 600 km only introduces 4 ms of latency for a single hop. Compared to the geosynchronous orbit, the reduced distance of the NGO reduces the dispersion of electromagnetic signals. This allows the satellite in NGO as well as the device communicating with the satellite to use a less powerful transmitter, use smaller antennas, allows improved re-use of spectrum by different devices, and so forth.

The system 100 shown here comprises a plurality (or "constellation") of satellites 102(1), 102(2), . . . , 102(S), each satellite 102 being in orbit 104. Also shown is a ground station 106, user terminals (UTs) 108, and user devices 110. Each user device 110 may execute one or more application modules. For example, the application modules may comprise email applications, telephony applications, videoconferencing applications, telemetry applications, web browser applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

With regard to FIG. 1, the uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 168 provides for communication between satellites 102 in the constellation.

One or more ground stations 106 are in communication with one or more satellites 102. The ground stations 106 may pass data between the satellites 102, a management system 150, networks 146 such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks 146. For example, the ground station 106 may connect to a terrestrial fiber optic communication network 146. The ground station 106 may act as a network gateway, passing data between the one or more communication networks 146 and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 may be in communication with a management system 150. The management system 150 may also be in communication, via the ground stations 106, with the satellites 102 and the UTs 108 that have joined the network 146. The management system 150 coordinates operation of the satellites 102, ground stations 106, UTs 108, and other resources of the system 100. The management system 150 may comprise one or more of an orbital mechanics system 152 or a scheduling system 158. The management system 150 may comprise one or more servers 148 or other computing devices.

The orbital mechanics system 152 determines orbital data 154 that is indicative of a state of a particular satellite 102 at a specified time. In one implementation, the orbital mechanics system 152 determines the orbital data 154 that predicts location, velocity, and so forth of particular satellites 102 at particular times or time intervals using second ephemeris data 156. The second ephemeris data 156 may comprise orbital elements and other information that represent characteristics of the orbit 104 of the satellites 102 in the constellation. The second ephemeris data 156 may be current in that it is updated with respect to a time window suitable for operations. For example, the second ephemeris data 156 may be updated every two hours, following a maneuver, and so forth. In some implementations, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

During operation, the second ephemeris data 156, or a portion thereof, may be transmitted via the satellites 102 of the constellation. For example, a downlink may be used to send the second ephemeris data 156 to all UTs 108 in current communication with a satellite 102, a beacon transmission may be used to send second ephemeris data 156 to UTs 108 that have not yet joined the network, and so forth.

The scheduling system 158 schedules resources to provide communication to the UTs 108. For example, the scheduling system 158 may determine handover data 164 that indicates when communication is to be transferred from the first satellite 102(1) to the second satellite 102(2). Continuing the example, the scheduling system 158 may also specify communication parameters such as frequency, timeslot indicative of when transmission is permitted, and so forth. These communication parameters may be associated with operation of an uplink to the satellite 102, downlink from the satellite 102 to the UT 108, and so forth. During operation, the scheduling system 158 may use information such as the orbital data 154, system status data 160, user terminal data 162, and so forth.

The system status data 160 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 160 may be indicative of past status, predictions of future status, and so forth. For example, the system status data 160 may include information such as projected data traffic for a specified interval of time based on previous transfers of data. In another example, the system status data 160 may be indicative of future status, such as a satellite 102 being unavailable to provide communication service due to scheduled maneuvering, scheduled maintenance, scheduled decommissioning, and so forth.

The user terminal data 162 may comprise information such as a geolocation of a particular UT 108, if a particular UT 108 is offline, last known geolocation of a UT 108 that is reported as offline, and so forth. The user terminal data 162 may include a priority assigned to data associated with that UT 108. For example, a particular UT 108 in use by a business may be assigned a higher priority relative to a UT 108 operated in a residential setting. The user terminal data 162 may also include other information, such as information about the communication capabilities of that particular UT 108, and so forth. For example, over time, different versions of UTs 108 may be deployed, having different communication capabilities such as being able to operate at particular frequencies, supporting different signal encoding schemes, having different antenna configurations, and so forth.

The handover data 164 is indicative of information such as a UT identifier indicative of a particular UT 108, a handover time indicative of when a handover is to occur, a next satellite identifier (ID) that is indicative of the next satellite 102 that will be providing communication service to the specified UT 108, and so forth. The handover data 164 facilitates an orderly transition of the UT 108 from a first satellite 102(1) to a second satellite 102(2).

The resource scheduling system 158 may determine handover data 164 at regular intervals. For example, handover data 164 may be generated for handover assessment intervals that are five seconds long. In other implementations, the handover data 164 may be determined on demand, at irregular intervals, and so forth.

In one implementation, the handover data 164 may involve the resource scheduling system 158 using the orbital data 154 and the geolocation of the UTs 108 to determine which UTs 108 will be moving out of range of the satellites 102 currently providing communication services to those UTs 108. Based on the orbital data 154 and the geolocation of each UT 108, the next satellite 102 may be determined. For example, this may be a satellite 102 that is already in range, or will be in range, at the handover time. In some implementations the handover data 164 may include a set of next satellites. For example, the handover data 164 may comprise a set of satellite IDs that indicate a primary satellite and a secondary satellite. Continuing the example, the second satellite 102(2) may be designated as the primary satellite expected to begin providing communication service to the UT 108 at the handover time. In the event the satellite 102(2) is unable to allocate resources to provide communication service to the UT 108, exception data indicative of this may be generated and provided to one or more of the network management system 150, the secondary satellite 102(3), the UT 108, or other devices. For example, the second satellite 102(2) may use an ISL 168 to send the exception data to the first satellite 102(1) and the secondary satellite 102(3). The first satellite 102(1) may send the exception data to the UT 108. The secondary satellite 102(3) may then allocate resources to provide communication service to the UT 108, and may subsequently provide the communication service beginning at the handover time.

The satellite(s) 102 include a beacon transmitter 170. The beacon transmitter 170 emits a beacon transmission. The beacon transmission may be used for a variety of purposes, including facilitating network entry by providing a signal for the UTs 108 trying to join the network to detect, distributing the second ephemeris data 156, and so forth. In some implementations a downlink signal carrying downstream data 142 may be used as the beacon transmission. The beacon transmission is discussed in more detail in the following description.

The UT 108 may include a clock 176. For example, the clock 176 may comprise a real-time clock that is set with respect to a common time reference standard associated with the ephemeris data. In some implementations, the time of the clock 176 may be set during manufacture, or set during setup of the UT 108 using an external time source. These external time sources may include, but are not limited to, a global navigation satellite system (GNSS), time signal receiver, external device with a clock such as a smartphone, and so forth.

The UT 108 includes a communication system 178, such as a satellite network interface, to establish communication with one or more satellites 102. The communication system 178 of the UT 108 may include components similar to those of a communication system 212 of a satellite 102 (see FIG. 2.) and may perform similar communication functionalities. For example, the communication system 178 may include one or more modems, digital signal processors, power amplifiers, antennas, processors, memories, storage devices, communications peripherals, interface buses, and so forth. The antennas may comprise at least one antenna that implements multiple antenna elements, such as a phased array antenna. In some implementations, the antennas may comprise an antenna mounted to a steerable azimuth/elevation mount.

The UT 108 passes data between the constellation of satellites 102 and the user device 110. The UT 108 may connect to the user device 110 using a second network interface. For example, the second network interface may comprise a wireless local area network, wired local area network, terrestrial wide area network, and so forth. The user device 110 may execute one or more application modules. The data includes upstream data 112 sent by the user device 110 or downstream data 142 that is addressed to the UT 108 or the user device 110. For example, during operation an application module may send upstream data 112 and receive downstream data 142. The upstream data 112 and the downstream data 142 each may comprise header data and payload data. The UT 108 may be fixed or in motion. For example, the UT 108 may be used at a residence, business, or on a vehicle such as a car, boat, aerostat, drone, airplane, and so forth.

The UT 108 includes a tracking system 180. During initial network entry, such as after the UT 108 first powers on or after a reset, the tracking system 180 searches and finds a beacon transmission from a satellite 102 and joins the network.

To search for the beacon transmission, the tracking system 180 uses state data 182 and previously stored first ephemeris data 184 to determine a predicted location 186 of a satellite 102. The state data 182 may comprise information indicative of current time and a geolocation associated with the UT 108. The current time may be obtained from the clock 176 or other external source. The geolocation may be determined using a GNSS, received from an external device, may have been previously stored, and so forth. For example, the geolocation may be provided from a smartphone that is in communication with the UT 108. The geolocation may be indicative of coordinates with respect to a surface of the Earth. In some implementations the geolocation may include altitude information.

In some implementations, the state data 182 may include other information, such as a heading or orientation of the antenna of the UT 108. For example, the state data 182 may indicate a magnetic heading, heading relative to true north, and so forth. The state data 182 may include other information such as orientation of the antenna relative to vertical, such as tilt. The state data 182 may include altitude of the antenna. For example, the state data 182 may include an altitude of one or more of the antenna or other portion of the UT 108. In some implementations the state data 182 or portions thereof may be assumed. For example, the heading of the antenna of the UT 108 may be assumed to be towards true north and the antenna of the UT 108 may be assumed to have a tilt of zero (perpendicular to vertical).

The previously stored first ephemeris data 184 provides information indicative of orbital elements of the orbit 104 of one or more satellites 102 of the constellation. For example, the first ephemeris data 184 may comprise orbital elements such as "two-line element" data for the satellites 102 in the constellation that was stored in a memory of the user terminal 108 before shipment of the UT 108 to the end-user, during setup of the UT 108 as provided by an external device, and so forth. As mentioned above, the first ephemeris data 184 may be out-of-date (relative to the second ephemeris data 156) due to various factors such as orbital perturbations, satellite maneuvers, satellite maintenance, and so forth.

Based on the predicted location 186, a predicted area 188 may be determined. The predicted area 188 may specify an area within which the satellite 102 is expected to be found with a specified probability. For example, the predicted area 188 may comprise an area within which the satellite 102 is expected to be found 99.99% of the time.

The UT 108 stores one or more sky coverage maps 190. A sky coverage map 190 defines discrete patches or covered areas of the entire sky, with each covered area based on beacon beamwidth and corresponding coverage area, receive beamwidth of the UT 108 receive antenna, receive antenna horizon limits, and so forth. A covered area describes a patch of sky within which reverse coverage of the receive beamwidth corresponds to the beacon beamwidth, and for which at least a minimum link budget is available to provide reliable reception by the UT 108. For example, if the link budget calls for a minimum 3 decibel (dB) signal-to-noise (SNR) ratio, this is used to determine the sky coverage map 190. The sky coverage map 190 may be determined based on characteristics of the beacon transmission, such as beam roll off angle, scan angle, and so forth. Adjacent covered areas specified by the sky coverage map 190 may overlap with one another. For example, each covered area may overlap with at least two other covered areas.

The tracking system 180 uses the sky coverage map 190 and the predicted area 188 to determine candidate covered area(s) 192. The candidate covered area(s) 192 specify the covered areas that overlap or otherwise coincide with the predicted area 188. For example, the predicted area 188 may overlap three different covered areas.

If a plurality of candidate covered areas 192 are determined, the candidate covered areas 192 may be sorted or ranked to determine search data 194 indicative of an order in which the candidate covered areas 192 are to be searched. For example, if a plurality of candidate covered areas 192 overlap the predicted area 188, the candidate covered areas 192 may be sorted in order of size of overlap with the predicted area 188. For example, the search data 194 may specify that a candidate covered area 192(1) that has 89% overlap with the predicted area 188 is searched first, the candidate covered area 192(2) with a 77% overlap is searched second, and the candidate covered area 192(3) with a 22% overlap is searched third.

The search data 194 is then used to operate the antenna of the user terminal 108 to search the sky in an attempt to find the beacon transmission from the beacon transmitter 170 of the satellite 102. For example, if the UT 108 comprises an electronically steerable phased antenna array, the search data 194 is used to operate the antenna to direct gain at a first time towards the first candidate covered area 192(1), at a second time towards the second candidate covered area 192(2), and so forth. In another example, if the UT 108 comprises a mechanical steered antenna, the search data 194 may be used to operate the antenna to direct the antenna at a first time towards the first candidate covered area 192(1), and so forth.

Once the beacon transmission has been detected by the UT 108 the UT 108 may establish communication with the satellite 102 and join the network. In one implementation, the beacon transmission or another transmission from the satellite 102 provides the (received) second ephemeris data 156 that is more current and thus accurate compared to the previously available (stored) first ephemeris data 184. The tracking system 180 may then use the state data 182 and second ephemeris data 156 to calculate precision tracking data 196 and begin tracking the satellite 102. In another implementation, once the beacon transmission has been detected, the UT 108 may use other techniques to track the satellite 102, such as changes in signal amplitude, doppler shift of a downlink signal, and so forth.

With the UT 108 now tracking the satellite 102, bidirectional communication may commence. For example, the communication system 178 of the UT 108 may direct the gain of the electronically steerable phased array antenna towards the predicted location 186 of the satellite 102 determined using the second ephemeris data 156 and send a signal to the satellite 102. Once the beacon transmission has been detected and the satellite 102 is being tracked by the tracking system 180, tracking of the satellite 102 may involve steering the antenna in smaller angular increments than those associated with searching the candidate covered areas 192. For example, during search a change to a different covered area may involve a shift of 7 degrees in azimuth, while during tracking the antenna may change at increments of 1 degree in azimuth.

The tracking system 180 may provide information such as predicted areas 188 or precision tracking data 196 on an ongoing basis. For example, the UT 108(1) may determine predicted area data every second during search and may determine precision tracking data 196 every 100 ms once tracking begins. In other implementations other intervals may be used.

By using the techniques described above, the UT 108 is able to quickly and efficiently search the sky to find the beacon transmission. Compared to traditional techniques, such as spiral or rectangular searches, these techniques result in a substantial decrease in the time required to find the beacon transmission. As a result, the UT 108 is able to rapidly join the network.

Once tracking is in progress and the UT 108 has joined the network by establishing communication with the satellite 102, the UT 108 may send upstream data 112 using the system 100. For example, the upstream data 112 may originate from the UT 108, or may be received by the UT 108 from a user device 110. The upstream data 112 may comprise a single packet or other unit of data transfer, or a plurality of packets or other units of data transfer. The upstream data 112 may be addressed to a device. The device that the upstream data 112 is addressed to may be accessible using one or more networks 146, such as the Internet.

The system 100 may include one or more PoP systems 144. Each PoP system 144 may comprise one or more servers or other computing devices. Separate PoP systems 144 may be located at different locations. In one implementation, a PoP system 144 may be associated with providing service to a plurality of UTs 108 that are located in a particular geographic region.

The PoP systems 144 may manage communication between the system 100 and the network 146. For example, a first PoP system 144 may receive the upstream data 112 and send that upstream data 112 to the network 146. In another example, the first PoP system 144 may receive the downstream data 142 and proceed to attempt delivery of the downstream data 142 to the UT 108.

The PoP system 144 is in communication with one or more ground stations 106(1), 106(2), . . . , 106(G) and the management system 150. In some implementations one or more functions may be combined. For example, the PoP system 144 may perform one or more functions of the management system 150. In another example, the PoP system 144 may be included in an integrated ground station 106.

One or more servers 148 may communicate with the POP system 144 via the network(s) 146. The servers 148 may provide various functions, such as content delivery, navigation, data storage and retrieval, and so forth. For example, the servers 148 may store video content that may be requested and streamed to a user device 110.

The satellite 102, the ground station 106, the user terminal 108, the user device 110, the management system 150, the PoP system 144, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks 146. For example, the transitory machine-readable signal may comprise transmission of software by the Internet.

Figure 2:
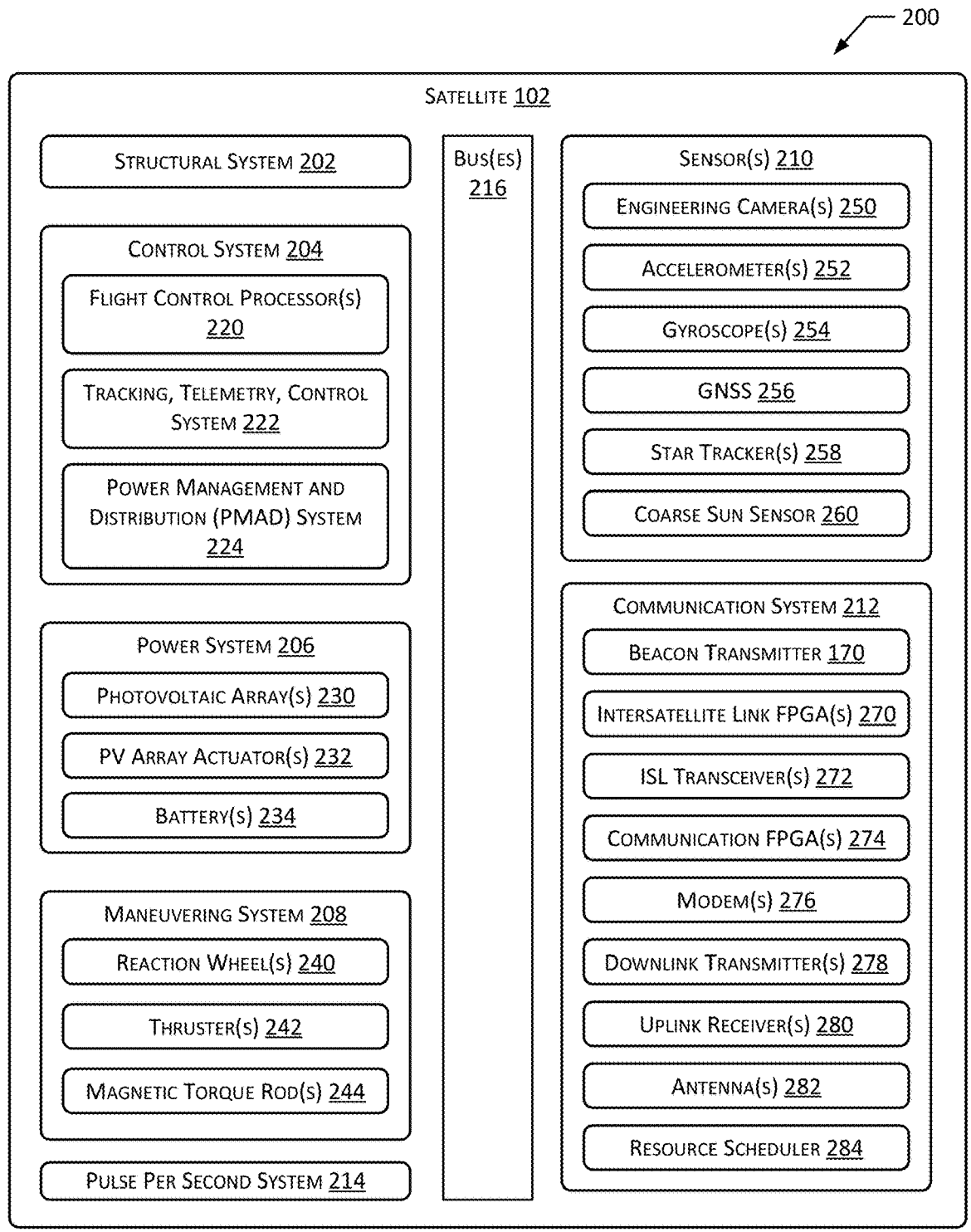
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations, the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 212 provides communication with one or more other devices, such as other satellites 102, ground stations 106, user terminals 108, and so forth. The communication system 212 may comprise the beacon transmitter 170. The beacon transmitter 170 may generate the beacon transmission that is then emitted by one or more of the antenna(s) 282.

The communication system 212 may include hardware to support the intersatellite link 168. For example, an intersatellite link FPGA 270 may be used to modulate data that is sent and received by an ISL transceiver 272 to send data between satellites 102. The ISL transceiver 272 may operate using radio frequencies, optical frequencies, and so forth.

One or more communication FPGA(s) 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102. The phased array antenna may be electronically steerable, allowing a beam to be electronically directed in a specified direction.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or "footprint". Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include a resource scheduler 284 that specifies uplink resources for a UT 108 to communicate with the satellite 102. The resource scheduler 284 may issue grant data indicative of these uplink resources responsive to a request from the UT 108 or may issue grants based on expected use. The grant data is then sent using the downlink transmitter 278.

Figure 3:
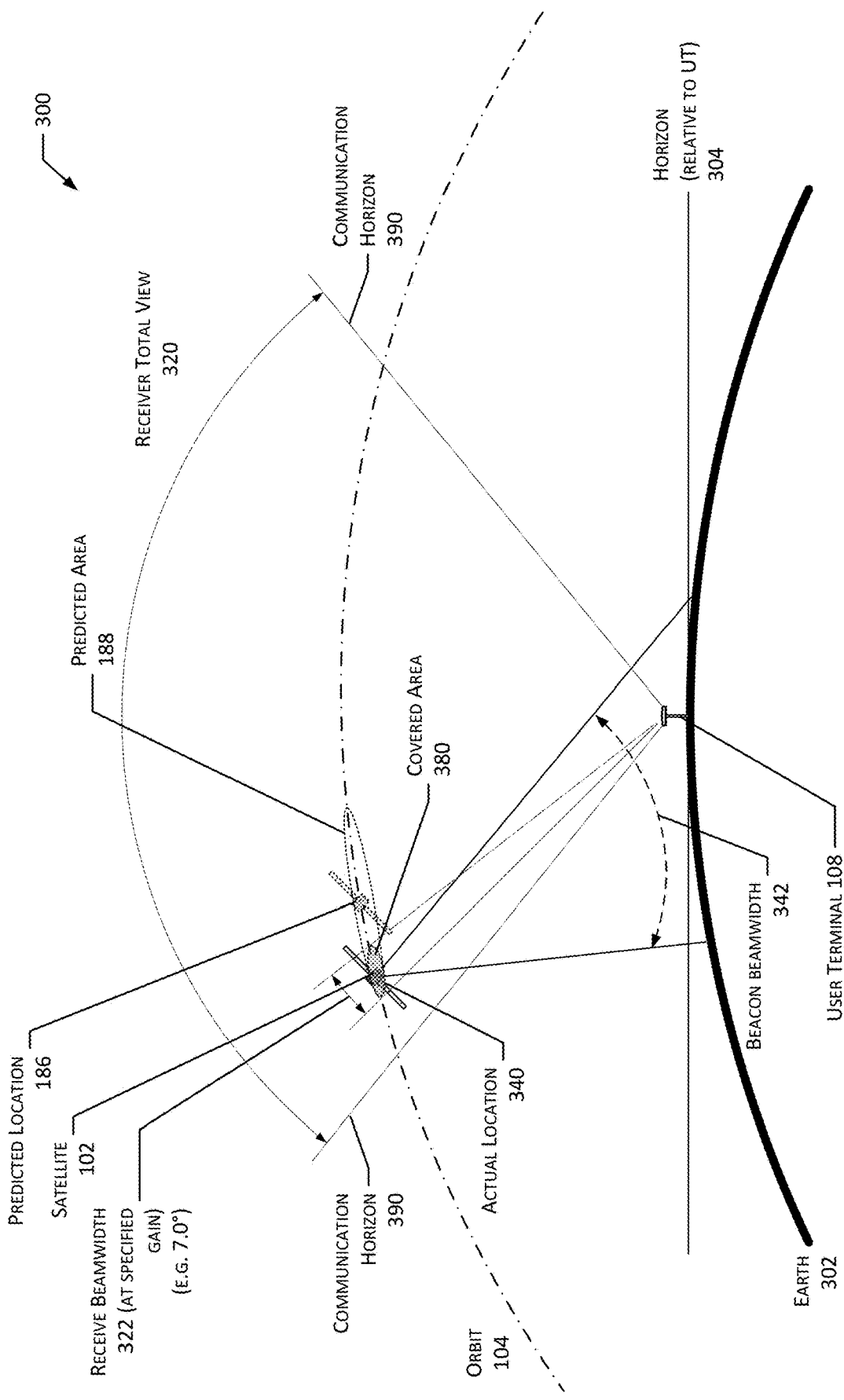
FIG. 3 illustrates a predicted location of a satellite, beacon beamwidth, and receive beamwidth, according to some implementations.

FIG. 3 illustrates at 300 a predicted location 186 of a satellite 102 and other aspects, according to some implementations. The orbit 104 with respect to Earth 302 is depicted with the satellite 102 at an actual location 340.

A single satellite 102 is shown for ease of illustration, and not by way of a limitation. The constellation may include many satellites 102 in the same or adjacent orbits 104, at different altitudes, and so forth. In some implementations the satellites 102 may not be in orbit 104. For example, the satellite 102 may be a statite that employs a solar sail to maintain a particular position.

The satellite 102 uses a beacon transmitter 170 to transmit a beacon transmission having a beacon beamwidth ("beamwidth") 342. "Beamwidth" as used in this disclosure may describe a solid angle that is representative of a primary lobe of antenna gain. The beacon beamwidth 342 produces a footprint or area on the Earth 302 or other object that the satellite 102 is orbiting within which the beacon transmission is greater than or equal to a minimum specified intensity.

Also depicted is a predicted location 186 in a predicted area 188 within which the satellite 102 is predicted to be. As shown in this implementation, the predicted location 186 differs from the actual location 340. This may be due to a variety of factors, including the first ephemeris data 184 used by the tracking system 180 being out of date, uncertainty as to the geolocation of the UT 108, uncertainty as to the current time relative to a time reference standard, and so forth.

Also depicted is the UT 108 and an associated receive beamwidth 322 of the antenna of the UT 108 while configured to receive the beacon transmission. The antenna(s) of the UT 108 has a communication horizon 390 relative to a local horizon 304 of the UT 108. The communication horizon 390 may be determined based on range of elevation that the antenna is able to traverse. For example, if the antenna is able to provide gain at an elevation of 30 degrees relative to the horizon 304, the communication horizon 390 would be 30 degrees. Below the communication horizon 390, the antenna is unable to provide gain in a specified direction.

The limits of the elevation as expressed by the communication horizon 390 and any azimuthal limitations, in implementations where the antenna has an azimuthal limitation, specify the receiver total view 320. The antenna of the UT 108 is expected to be able to establish communication with a satellite 102 that is within the receiver total view 320 and a directing gain of the onboard antennas towards the earth 302.

In this illustration a single covered area 380 is depicted, showing the correspondence at the altitude of the orbit 104 between the beacon beamwidth 342 and the receive beamwidth 322. So long as the beacon beamwidth 342 is directed towards the UT 108 and the UT 108 has the receive beamwidth 322 directed towards the satellite 102, a sufficient SNR of the beacon transmission will be obtained to allow the UT 108 to acquire and track the satellite 102. The covered areas 380 are discussed in more detail with regard to FIG. 4.

Figure 4:
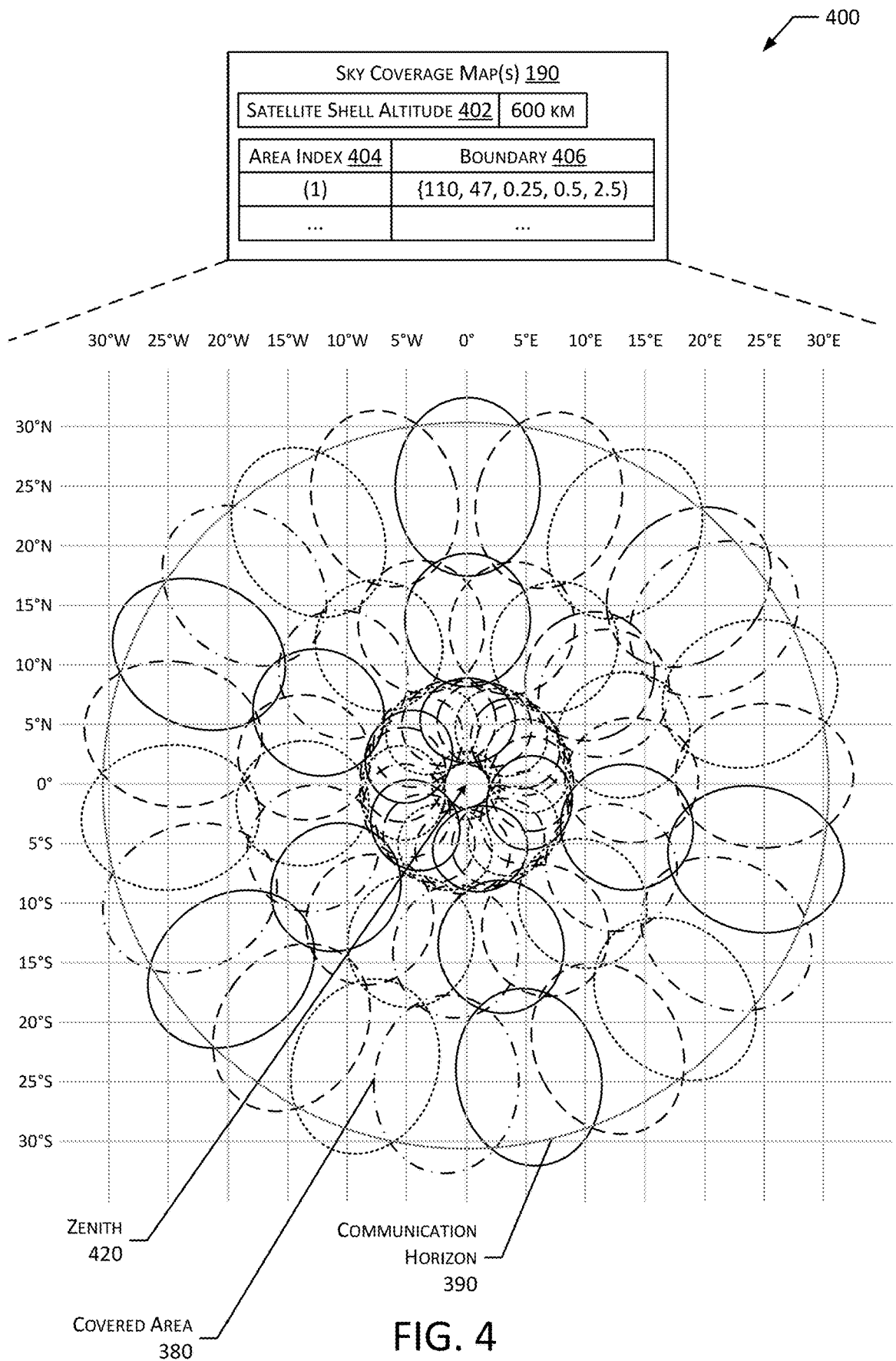
FIG. 4 illustrates a sky coverage map comprising a plurality of covered areas, each covered area comprising an area of the sky that corresponds to both the beacon beamwidth and the receive beamwidth, according to some implementations.

FIG. 4 illustrates at 400 a sky coverage map 190 comprising a plurality of covered areas 380. Included is a graph depicting a sky view and covered areas 380. The graph includes axes indicative of directions, relative to the geolocation of the UT 108. For example, the zenith 420 is located at coordinates of {0,0}. Each covered area 380 comprises an area of the sky that corresponds to both the beacon beamwidth 342 and the receive beamwidth 322, according to some implementations. The size, shape, position, and other characteristics of the covered areas 380 specified by the sky coverage map 190 may be determined using one or more factors. These factors include, but are not limited to, satellite altitude, transmit power of the beacon transmitter 170, gain of the antenna used to emit the beacon transmission, effective radiated power of the beacon transmission, beacon beamwidth 342, receive beamwidth 322, minimum signal-to-noise (SNR) ratio associated with reception of the beacon transmission by the communication system 178, and so forth.

In the implementation shown here, the sky coverage map 190 is configured to avoid gaps in coverage from a zenith 420 to the communication horizon 390. For example, each of the covered areas 380 overlaps with at least two other covered areas 380. Due to the interaction between the solid angles of the beacon beamwidth 342 and the receive beamwidth 322, the corresponding common subtended area described by the covered areas 380 changes with respect to elevation. For example, the covered area 380 centered on the zenith 420 is circular and smaller than the covered area 380 at the edges of the communication horizon 390 that is elliptical and has a greater area.

The sky coverage map 190 may comprise a data structure that comprises a satellite shell altitude 402 value that indicates which altitude the sky coverage map 190 is applicable to. The sky coverage map 190 may comprise an area index 404 that specifies a particular covered area 380, while corresponding boundary data 406 describes the boundary of that covered area 380. For example, the boundary data 406 may specify the azimuth and elevation of a first focus of an ellipse, and other parameters of an ellipse such as a semi-major axis, semi-minor axis, linear eccentricity, and so forth. In other implementations, other data structures may be used to represent the sky coverage map 190.

Figure 5:
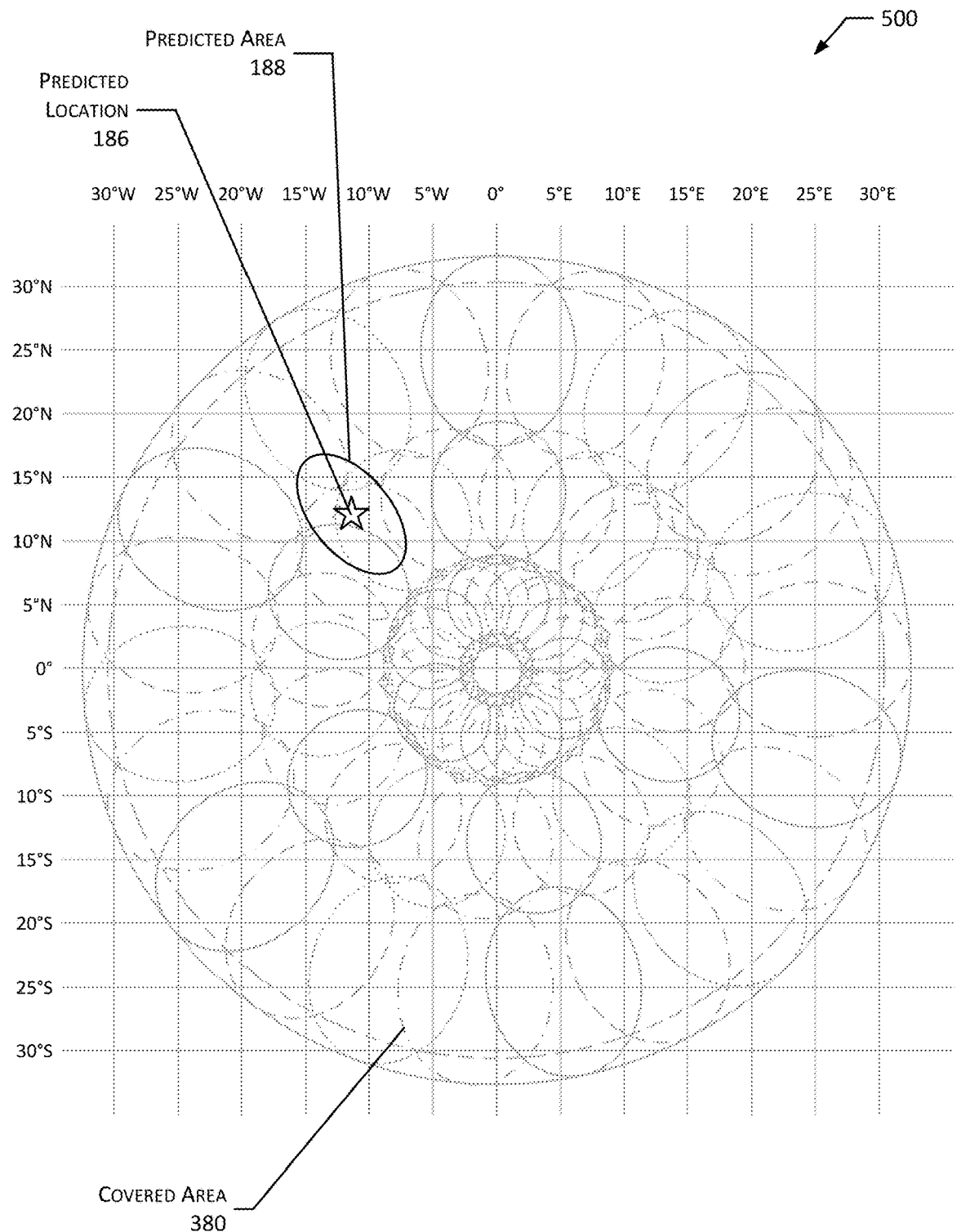
FIG. 5 illustrates the sky coverage map of FIG. 4 with a predicted area of a satellite, according to some implementations.

FIG. 5 illustrates at 500 the sky coverage map of FIG. 4 with a predicted area 188 of a satellite 102 shown, according to some implementations. In this illustration, the predicted location 186 may be a focus of the predicted area 188.

Figure 6:
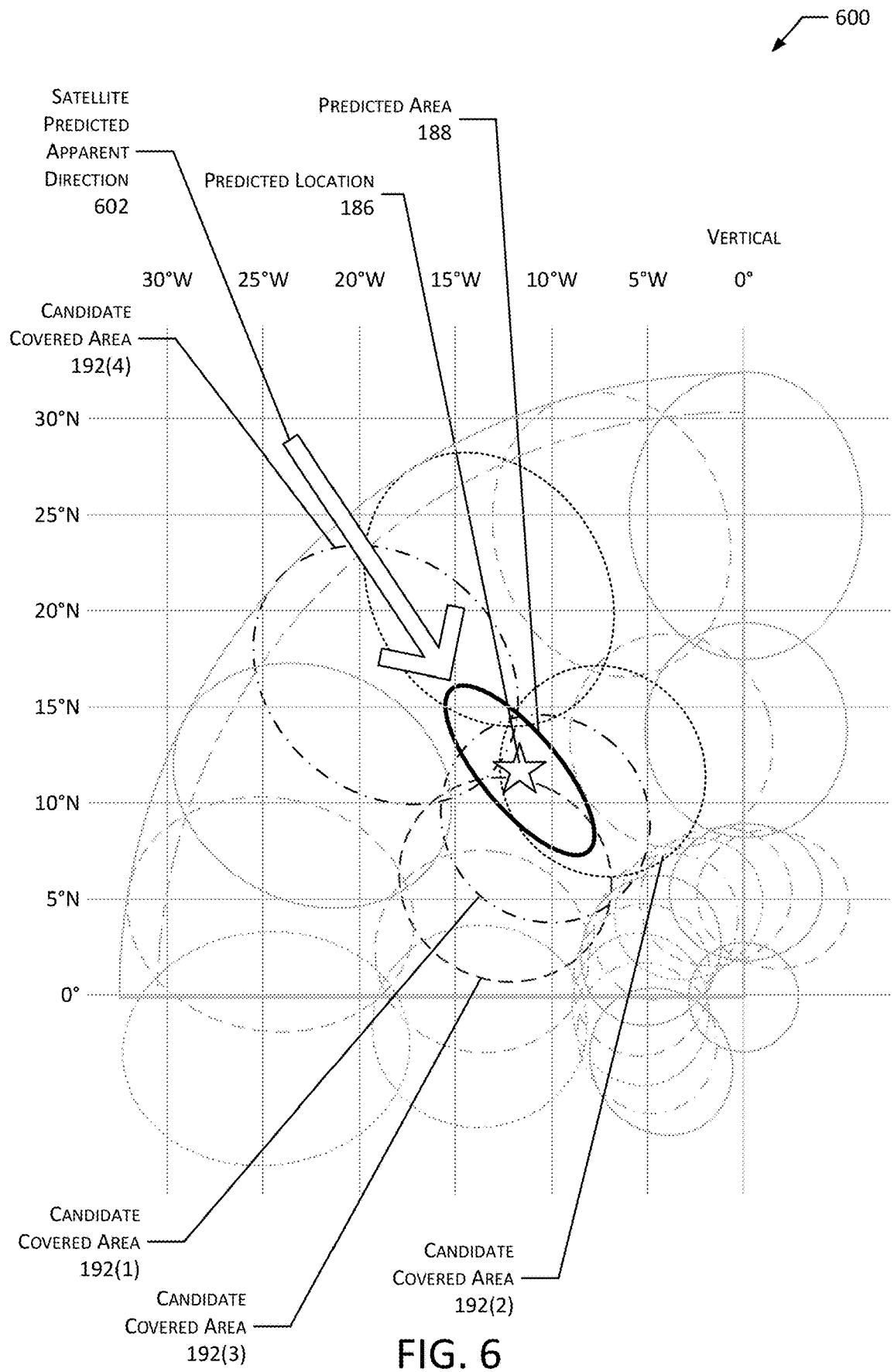
FIG. 6 illustrates an enlarged portion of the sky coverage map of FIG. 5 showing candidate covered areas that overlap with the predicted area, according to some implementations.

FIG. 6 illustrates at 600 an enlarged portion of the sky coverage map of FIG. 5 showing candidate covered areas 192(1)-192(4) that overlap with the predicted area 188, according to some implementations.

In other implementations, instead of or in addition to overlap, other techniques may be used to determine correspondence between a predicted location 186 and one or more covered areas 380 to determine candidate covered areas 192. Two shapes, such as the covered area 380 and the predicted area 188, may be deemed to overlap if there is at least one point that is common between the two. In some implementations, a minimum overlap may be specified for inclusion into the candidate covered areas 192. For example, if the minimum overlap specifies 3% and a covered area 380 only overlaps 1% of the predicted area 188, the covered area 380 is not included in the set of candidate covered areas 192.

In this illustration, the candidate covered area 192(1) overlaps the largest portion of the predicted area 188, while the candidate covered area 192(4) has the least overlap with the predicted area 188.

In some implementations, the set of candidate covered areas 192 used to determine the search data 194 may be pruned to remove redundant coverage. For example, the search data 194 may omit the candidate covered area 192(3) as the portion overlapping the predicted area 188 is completely within the candidate covered area 192(1), which is included in the search data 194.

In one implementation, the determination as to whether a covered area 380 is a candidate covered area 192 may be determined using a distance between a predicted location 186 and a specified location of a covered area 380, such as a focus. For example, the candidate covered areas 192 may comprise those covered areas 380 having a focus of an ellipse describing their respective boundary that is less than or equal to a threshold distance from the predicted location 186.

The search data 194 may specify search order in which the constituent candidate covered areas 192 are to be searched. In some implementations, the UT 108 may be capable of performing a sequential search, operating the antenna to direct gain in a first direction corresponding to a first covered area 192(1) at a first time, in a second direction corresponding to a second covered area 192(2) at a second time, and so forth. In other implementations, the UT 108 may be capable of performing a simultaneous search in two or more different directions.

The search order specified by the search data 194 may be determined based on one or more of a satellite predicted apparent direction 602, overlapping area between the predicted area 188 and the candidate covered area 192, index number associated with the candidate covered area 192, relative position of the candidate covered area 192 with respect to the plurality of covered areas 380, or other factors.

The ordering of the candidate covered areas 192 included as specified in the search data 194 may be determined based on the satellite predicted apparent direction 602. The candidate covered areas 192 may be ordered for search in an overall direction that is generally towards or away from the satellite predicted apparent direction 602.

The overlapping area may be indicative of a magnitude or size of the overlap between the predicted area 188 and the candidate covered area 192. For example, the candidate covered area 192 that has the greatest overlap with the predicted area 188 may be searched first.

Each covered area 380 of the sky coverage map 190 may be associated with an index number. In some implementations, the index number may be used to specify the search order.

The relative position of the candidate covered area 192 with respect to the plurality of the covered areas 380 allows for ordering such as zenith 420 to communication horizon 390, or vice versa, serpentine, or other patterns.

In other implementations, the search order may be determined using a random or pseudo-random selection.

Figure 7:
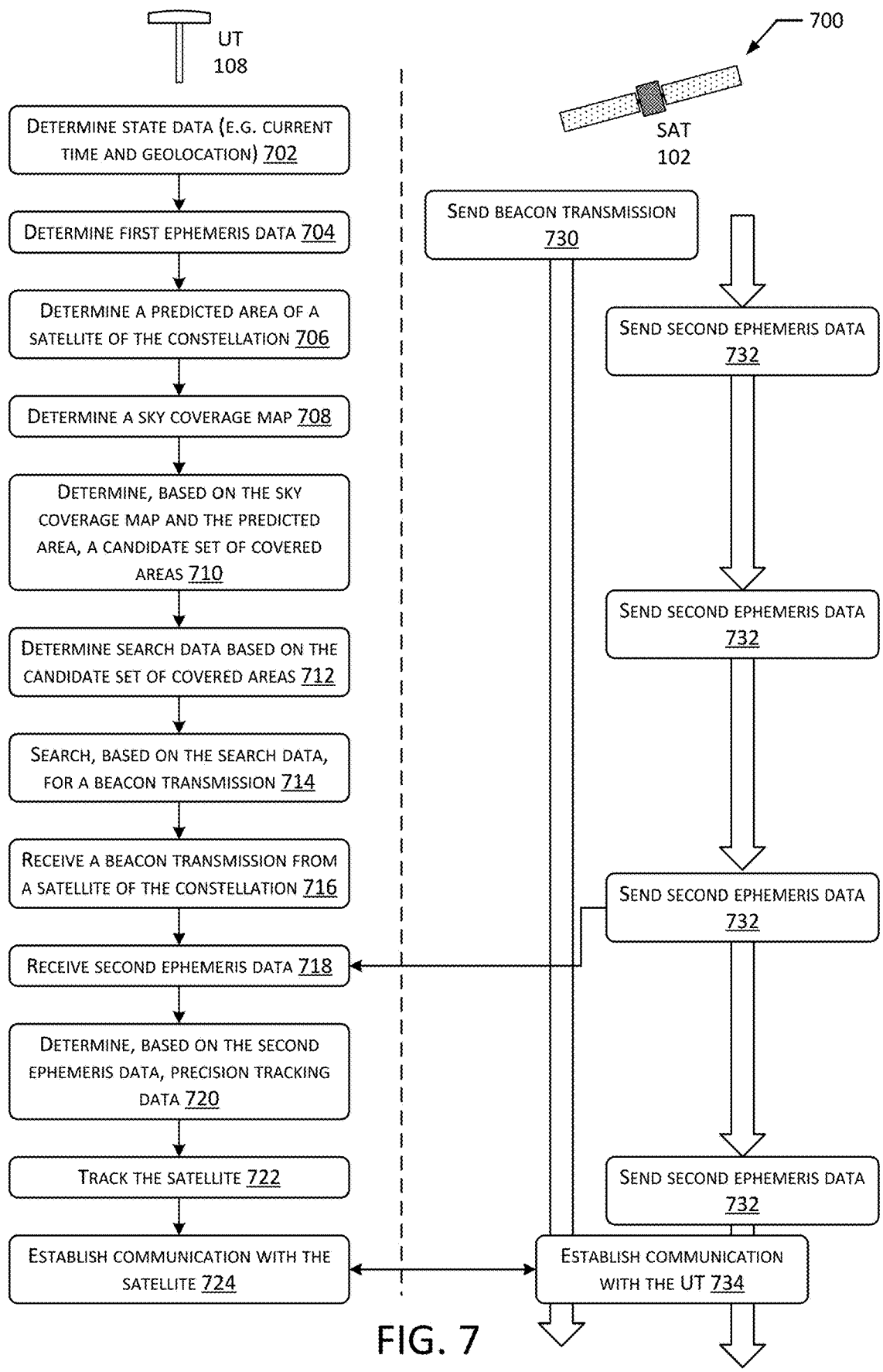
FIG. 7 is a flow diagram of a process to use a sky coverage map to scan for a beacon transmission on initial network entry, according to some implementations.

FIG. 7 is a flow diagram 700 of a process to use a sky coverage map 190 to scan for a beacon transmission and perform initial network entry, according to some implementations. In this illustration, a UT 108 and a satellite 102 are shown. At 730 the beacon transmitter 170 of the satellite 102 sends a beacon transmission. In one implementation the beacon transmission may comprise a continuous transmission. In another implementation, the beacon transmission may be a dedicated transmission, while in other implementations the beacon may comprise a portion of downlink transmission. At 732 the satellite 102 may also send the second ephemeris data 156. In the implementation shown here, the second ephemeris data 156 is repeatedly transmitted as successive times. In some implementations, the beacon transmission may include the second ephemeris data 156. In other implementations, the second ephemeris data 156 may be transmitted separately from the beacon transmission, as a subcarrier of the beacon transmission, as a different transmission from the beacon transmission, and so forth.

At 702 the UT 108 determines state data 182. For example, the state data 182 may comprise information indicative of a current time and a geolocation of the UT 108. In one implementation, the UT 108 may comprise a GNSS receiver that provides current time and geolocation information. In other implementations, the UT 108 may acquire this information from an external source. For example, the UT 108 may obtain current time and geolocation data from a smartphone that is in communication with the UT 108. In another example, the UT 108 may provide a user interface that is used to obtain the state data 182 from a user. In some implementations, the state data 182 may comprise one or more of antenna orientation with respect to a specified direction such as true north, tilt relative to vertical, altitude, or other information.

In some implementations, the geolocation may be indicative of a specified area on the surface of the Earth 302. For example, the system 100 may specify a set of areas that cover the Earth 302. The geolocation may be specified as a particular index number of these areas. In another example, the geolocation may be specified by postal code, city, and so forth.

At 704 the UT 108 determines the first ephemeris data 184. For example, previously stored first ephemeris data 184 may be retrieved, or may be determined based on previously stored data such as orbital elements. In some implementations, the first ephemeris data 184 may be associated with one or more satellites 102 of a constellation that comprises non-geostationary satellites.

At 706 based the state data 182 and the first ephemeris data 184, the UT 108 determines a predicted area 188 of sky that a first satellite 102 of the constellation is predicted to be within. For example, a predicted location 186 may be determined using the first ephemeris data 184 and the state data 182. Based at least in part on the predicted location 186, the predicted area 188 may be determined. For example, the predicted area 188 may comprise a polygon that is centered on the predicted location 186. In some implementations, the size of the predicted area 188 may be determined based on the uncertainty of one or more inputs to the tracking system 180.

At 708 a sky coverage map 190 is determined. In one implementation, the sky coverage map 190 may be retrieved from memory. In another implementation, the sky coverage map 190 or a portion thereof may be calculated by the UT 108. The sky coverage map 190 is indicative of a plurality of covered areas 380, each covered area 380 being indicative of a predefined portion of the sky. In some implementations, the determination of the sky coverage map 190 may be based on the altitude of the UT 108 and the satellite shell altitude 402. For example, a UT 108 located atop Mount Denali at 6,190 meters above sea level may use a different sky coverage map 190 than if the UT 108 was located at sea level.

At 710 the UT 108 determines, based on the sky coverage map 190 and the predicted area 188, a candidate set of one or more covered areas 380. For example, the set may comprise those covered areas 380 that overlap the predicted area 188.

At 712 the UT 108 determines search data 194 based on the candidate set of one or more covered areas 380. For example, the search data 194 may specify the order and area indices 404 to be searched.

At 714, based on the search data 194, the UT 108 searches for the beacon transmission. For example, the UT 108 may operate the antenna of the UT 108 to search individual covered areas 380 of the candidate set of covered areas 380 in the order specified by the search data 194.

At 716 the UT 108 receives a beacon transmission from a satellite 102 of the constellation. For example, the beacon transmission may be received using a satellite network interface of the communication system 178 of the UT 108. In some implementations, this may be the beacon transmission specific to the satellite 102 sought. In other implementations, a beacon transmission from another satellite 102 in the constellation may be used.

At 718 the UT 108 receives the second ephemeris data 156 from the satellite 102.

At 720, based on the second ephemeris data 156, precision tracking data 196 is determined.

At 722 the satellite 102 is tracked by the antenna of the UT 108. For example, the precision tracking data 196 may be used to steer the antenna. In another example, other techniques may be used to track the satellite 102.

At 724 the UT 108 establishes communication with the satellite 102. For example, the UT 108 may send a signal to the satellite 102 requesting grant data to use an uplink to the satellite 102. The UT 108 and the satellite 102 may perform other handshaking operations to establish bi-directional communication with the satellite 102. This allows the UT 108 entry to the network, allowing upstream data 112 and downstream data 142 to be transferred by the UT 108 via the satellite 102.

In some implementations, one or more of the operations described may be combined, re-ordered, or omitted. For example, in some implementations operations 718-720 may be omitted.

Times, intervals, durations, and the like as used in this disclosure may be specified with respect to actual clock time, system time, system timing references, discrete timeslots or interval indicators, and so forth. For example, time ticks may be specified relative to an epoch that resets at 10-minute intervals. In another example, actual clock time obtained from a Global Position System receiver may be used to coordinate operation of one or more elements of the system 100.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A user terminal (UT) comprising:
a first network interface connected to a first antenna; and
a first set of one or more processors executing instructions to:
determine first data comprising a current time and a geolocation of the UT;
determine first ephemeris data, wherein the first ephemeris data is associated with one or more satellites of a constellation of non-geostationary satellites;
determine, based on the first data and the first ephemeris data, a first area of sky that a first satellite of the constellation is predicted to be within;
determine a map, wherein the map is indicative of a plurality of areas, each area of the plurality of areas being indicative of a portion of the sky, and wherein the map is based on:
a beacon beamwidth of a satellite, and
a receive bandwidth of the first antenna; and
determine, based on the map and the first area, a set of one or more areas of the plurality of areas.

2. The UT of claim 1, the first set of one or more processors further executing the instructions to:
operate the first antenna to search individual areas of the set of one or more areas;
receive, using the first network interface, a transmission;
receive, using the first network interface, second ephemeris data; and
establish, using the second ephemeris data and the first antenna, bi-directional communication with the first satellite.

3. The UT of claim 1, the first set of one or more processors further executing the instructions to:
determine the map from a plurality of maps, based on one or more of:
the first data, or
the first ephemeris data.

4. The UT of claim 1, wherein each area of the plurality of areas overlaps at least two other areas of the plurality of areas.

5. The UT of claim 1, wherein the set of one or more areas comprises a second plurality of areas; and
the first set of one or more processors further executing the instructions to:
determine a search order of the set of one or more areas based on one or more of:
a satellite predicted apparent direction,
an overlapping area between the first area and at least one of the plurality of areas of the map,
index numbers associated with an area of the set of one or more areas, or
a relative position of the area with respect to the plurality of areas; and
search individual areas in the set of one or more areas in the search order.

6. The UT of claim 1, further comprising a second network interface; and
the first set of one or more processors further executing the instructions to receive, using the second network interface, at least a portion of the first data.

7. The UT of claim 1, further comprising a global navigation satellite system (GNSS) receiver; and
the first set of one or more processors further executing the instructions to determine at least a portion of the first data using the GNSS receiver.

8. The UT of claim 1, wherein the first antenna comprises an electronically steerable phased array antenna.

9. The UT of claim 1, the first set of one or more processors further executing the instructions to:
receive, using the first network interface, second ephemeris data;
track the first satellite based on the second ephemeris data; and
send data to the first satellite.

10. A method comprising:
determining first data comprising a current time and a geolocation associated with a user terminal (UT);
determining first ephemeris data, wherein the first ephemeris data is associated with satellites of a constellation of non-geostationary satellites;

determining, based on the first data and the first ephemeris data, a first area of sky that a first satellite of the constellation is predicted to be within;

determining a map, wherein the map is indicative of a plurality of areas, each area of the plurality of areas being indicative of a portion of the sky, and wherein the map is based on:
  a beacon beamwidth of a satellite, and
  a receive beamwidth of an antenna of the UT;
determining, based on the map and the first area, a set of one or more areas;
searching, with the antenna of the UT, individual areas of the set for a transmission; and
receiving the transmission.

11. The method of claim 10, further comprising:
receiving, by the UT, second ephemeris data;
tracking, using the antenna of the UT, the first satellite based on the second ephemeris data; and
sending data to the first satellite.

12. The method of claim 10, further comprising:
determining the map, from a plurality of maps, based on one or more of:
  the first data, or
  the first ephemeris data.

13. The method of claim 10, wherein each area of the plurality of areas overlaps at least two other areas.

14. The method of claim 10, further comprising:
determining a sequential search order of the set of one or more areas based on one or more of:
  a satellite predicted apparent direction,
  an overlapping area between the first area and at least one of the plurality of areas,
  an index number associated with an area of the set of one or more areas, or
  a relative position of the area with respect to the plurality of areas; and
wherein the searching is performed in the sequential search order.

15. The method of claim 10, further comprising:
receiving second ephemeris data; and
establishing, using the second ephemeris data and the antenna of the UT, bi-directional communication with the first satellite.

16. A system comprising:
a first network interface connected to a first antenna that is electronically steerable; and
a set of one or more processors executing instructions to:
  determine first data comprising a current time and a geolocation of the system;
  determine first ephemeris data, wherein the first ephemeris data is associated with one or more satellites of a constellation of satellites;
  determine, based on the first data and the first ephemeris data, a first area of sky that at least one satellite of the constellation is predicted to be within;
  determine a map, wherein the map is indicative of a plurality of areas, each area being indicative of a predefined portion of the sky, and wherein the map is based on:
    a beacon beamwidth of a satellite, and
    a receive bandwidth of the first antenna;
  determine, based on the map and the first area, a set of one or more areas;
  operate the first antenna to search the set of one or more areas; and
  receive, using the first network interface, a transmission.

17. The system of claim 16, wherein the transmission comprises second ephemeris data; and
the set of one or more processors further executing the instructions to:
  operate the first antenna to track a first satellite based on the second ephemeris data; and
  send, using the first network interface, data to the first satellite.

18. The system of claim 16, the set of one or more processors further executing the instructions to:
determine the map from a plurality of maps, based on one or more of:
  the first data, or
  the first ephemeris data.

19. The system of claim 16, the set of one or more processors further executing the instructions to:
determine a search order of the set of one or more areas based on one or more of:
  a satellite predicted apparent direction,
  an overlapping area between the first area and at least one of the plurality of areas,
  an index number associated with an area of the set of one or more areas, or
  a relative position of the area with respect to the plurality of areas; and
search individual areas in the set of one or more areas in the search order.

20. The system of claim 16, the system further comprising a second network interface; and
the set of one or more processors further executing the instructions to receive, using the second network interface, at least a portion of the first data.

* * * * *